United States Patent [19]
Lindeberg et al.

[11] Patent Number: 6,094,479
[45] Date of Patent: Jul. 25, 2000

[54] COMPUTER TELEPHONY INTEGRATION GATEWAY

[75] Inventors: Jan H. I. Lindeberg, Nivaa; Allan Smidt, Broenshoej; Peter Hammarstrom, Sandviken, all of Denmark

[73] Assignee: Telefonaktiebolaget LM Ericsson, Stockholm, Sweden

[21] Appl. No.: 08/851,897

[22] Filed: May 6, 1997

[51] Int. Cl.[7] ........................... H04M 7/00; H04M 3/523; H04L 12/66

[52] U.S. Cl. ........................ 379/220; 370/352; 370/401; 370/467; 379/230; 379/265; 379/901

[58] Field of Search ................................... 379/219, 220, 379/225, 227, 234, 265, 266, 207, 211, 212, 230, 309, 901; 370/352, 353, 354, 401, 467

[56] References Cited

U.S. PATENT DOCUMENTS

| | | | |
|---|---|---|---|
| 4,677,588 | 6/1987 | Benjamin et al. | 395/200.58 |
| 5,282,244 | 1/1994 | Fuller et al. | 379/230 |
| 5,420,916 | 5/1995 | Sekiguchi | 379/230 |

(List continued on next page.)

FOREIGN PATENT DOCUMENTS

| | | | |
|---|---|---|---|
| 0 142 004 | 5/1985 | European Pat. Off. | 709/228 |
| 0 398 408 A2 | 3/1990 | European Pat. Off. | 379/201 |
| 0 478 206 A2 | 4/1992 | European Pat. Off. | 379/221 |
| 0 647 051 | 4/1995 | European Pat. Off. | 379/266 |
| 0 707 406 | 4/1996 | European Pat. Off. | 379/265 |
| 0 717 570 A2 | 6/1996 | European Pat. Off. | H04M 3/42 |
| 0 726 682 | 8/1996 | European Pat. Off. | 379/207 X |
| 42 12 102 A1 | 11/1992 | Germany | H04M 11/00 |
| 4 441 753 | 6/1995 | Germany | H04L 12/00 |
| 93/16547 | 8/1993 | WIPO | H40M 7/10 |
| 97/16007 | 5/1994 | WIPO | H04L 12/66 |
| 96/04754 | 2/1996 | WIPO | 379/229 |
| 96/14704 | 5/1996 | WIPO | 379/220 |
| 96/19904 | 6/1996 | WIPO | H04Q 3/545 |
| 96/38018 | 11/1996 | WIPO | H04Q 11/04 |

OTHER PUBLICATIONS

M. Sevcik and R. Lueder, "Customers in Driver's Seat: Private Intelligent Network Control Point," 15th International Switching Symposium, vol. 2, Apr. 23–28, 1995, pp. 41–44.

Globecom 89, Fung, "Defining intelligent network services in a multivendor distributed environment," vol. 1, Nov. 27, 19889, Dallas, Texas, US, pp. 132–136, XP000145739.

Proceedings of the National Communications Forum., Calautti, "Issues and some solutions for internetwork CCS7 implementation," vol. 45, Sep. 30, 1991 –Oct. 2, 1991, Chicago, Illinois, US, pp. 220–222, XP000267446.

Annual Review of Communications, vol. 46, Jan. 1, 1992, pp. 491–495, XP000321961, E. Bonkowski, "An End User's Expectations of the Advanced Intelligent Network".

(List continued on next page.)

Primary Examiner—Harry S. Hong
Attorney, Agent, or Firm—Nixon & Vanderhye P.C.

[57] ABSTRACT

A telecommunications system combines the benefits provided by a public intelligent network and a customer premise equipment (CPE)-based private network to provide enhanced telecommunications services. The public intelligent network includes an IN service control element and an IN switching control element used to provide IN services following IN control procedures. The private telecommunications network includes a computer telephony integration (CTI) server providing CTI services following CTI control procedures. A network gateway is provided between the public and private networks. The network gateway establishes a service logic communication between the IN service control element and the CTI server and permits, for example, the CTI server to request a service is from the IN service control element. Events related to the requested service are returned via the network gateway. The network gateway includes a CTI interface that emulates a private branch exchange switch to receive and translate switching service communications from the CTI server, and an IN interface that emulates a public IN node to receive and translate service communications from the service control point.

32 Claims, 7 Drawing Sheets

6,094,479
Page 2

U.S. PATENT DOCUMENTS

| | | | |
|---|---|---|---|
| 5,452,350 | 9/1995 | Reynolds et al. | 379/220 |
| 5,490,212 | 2/1996 | Lautenschlager | 379/225 |
| 5,517,562 | 5/1996 | McConnell | 379/207 |
| 5,517,564 | 5/1996 | Slater et al. | 379/229 |
| 5,526,413 | 6/1996 | Cheston, III et al. | 379/201 |
| 5,526,415 | 6/1996 | Wakamoto | 379/230 |
| 5,533,115 | 7/1996 | Hollenbach et al. | 379/220 |
| 5,537,470 | 7/1996 | Lee | 379/266 |
| 5,566,235 | 10/1996 | Hetz | 379/201 |
| 5,583,927 | 12/1996 | Ely et al. | 379/207 |
| 5,621,789 | 4/1997 | McCalmont et al. | 379/265 |
| 5,623,601 | 4/1997 | Vu | 395/187.01 |
| 5,640,446 | 6/1997 | Everett et al. | 379/230 X |
| 5,680,552 | 10/1997 | Netravali et al. | 395/200.8 |
| 5,701,301 | 12/1997 | Weisser, Jr. | 370/428 |
| 5,724,418 | 3/1998 | Brady | 379/22 |
| 5,757,894 | 5/1998 | Kay et al. | 379/127 |
| 5,784,450 | 7/1998 | Stahl | 379/233 |
| 5,784,451 | 7/1998 | Smith, Jr. | 379/265 |
| 5,805,692 | 9/1998 | Oerlemans et al. | 379/225 |
| 5,818,921 | 10/1998 | Vander Meiden et al. | 379/225 |
| 5,825,868 | 10/1998 | Diamond | 379/243 |
| 5,838,782 | 11/1998 | Lindquist et al. | 379/230 |
| 5,841,854 | 10/1998 | Schumacher et al. | 379/265 |
| 5,852,660 | 12/1998 | Lindquist et al. | 379/230 |
| 5,867,570 | 2/1999 | Bargout et al. | 379/207 |
| 5,905,792 | 5/1999 | Miloslavsky | 379/309 X |

OTHER PUBLICATIONS

*Annual Review of Communications,* vol. 46, Jan. 1, 1992, pp. 610–625, ZP000321976, R.W. Petrunka, "Exchange Access & Operator Services in AIN".

*British Telecommunications Engineering,* vol. 14, Jul. 1995, pp. 98–105, Andrew Catchpole et al., "Introduction to Computer Telephony Integration".

*Byte,* Sep. 1995, pp. 201–207, James Burton, "Standard Issue".

*Ericsson Product Overview,* Ericsson Networks AB 1996, EN/LZT 102 2389 R.A., pp. 5–27, "MD110 Application Link for CSTA 2.0".

*Hewlett Packard Technical Data,* "Applied Computerized Telephony (ACT)", Date unavailable.

*International Switching Symposium,* Oct. 25–30, 1992, Yokohama, Japan, vol. 2, pp. 34–38, Ingeborg Graetz et al., "In and CSTA—two sides of the same coin?".

*Telecommunications Journal of Australia,* vol. 46, No. 3, 1996, pp. 13–18, XP002048699, John Damrow et al., "The Intelligent Network Call Centre".

COMPUTER TELEPHONY INTEGRATION GATEWAY

RELATED APPLICATIONS

This application is related to two commonly-assigned U.S. patent applications: U.S. patent application Ser. No. 08/852,024, filed May 6, 1997, entitled "Cooperative Call Processing Across Public and Private Intelligent Networks," now U.S. Pat. No. 5,995,610, and U.S. patent application Ser. No. 08/851,898, filed May 6, 1997, entitled "Method and Arrangement for Integrating Intelligent Network Services With Operator Assisted Services."

FIELD OF INVENTION

The present invention relates to telecommunication services, and in particular, to telecommunications services that involve both computer-based and telephony-based service features.

BACKGROUND AND SUMMARY OF THE INVENTION

As computers and telephones become more and more integrated, a new technology has evolved referred to as computer telephony integration (CTI). Computer telephony integration may be defined as the functional merging of telephony and data processing services in order to add value to business or other service applications. More specifically, CTI permits an exchange of command and status information between voice and data processing environments. The telephony system is typically a private branch exchange (PBX) but could be a telephone line established for a single line business connected to a computer. The data processing system may range from a large mainframe computer to a small, personal computer.

CTI architectures include complex combinations of both hardware and software systems. A simple architecture requires only a direct link from the phone to an external adapter that connects to a PC serial or parallel port. Users can have direct control over call routing so that to transfer a call, the user just clicks on an icon and the PC sends a message to the switch emulating a command from the phone requesting that the switch transfer the call. A server-based architecture connects a telephone switch to a server on a local area network (LAN). The LAN server, rather than the switch or user, is responsible for routing calls. In PBX-based computer telephony integration, a common CTI channel is provided between the computer system and the PBX telephone system (the PBX is connected to the public telephone network). Each user is viewed as a CTI client having a PC or workstation connected to a local area network. Each user also has a separate telephone that is connected directly to the PBX. There is no physical connection between the individual workstations and telephones.

CTI protocols have been developed to permit the computer and telephone systems to communicate. More formally, a CTI protocol is a set of messages and associated sequencing rules for communicating at application layer 7 of the OSI model between the computer and telephone system. Many of these CTI protocols are proprietary or closed and do not allow for application internetworking across PBX platforms. Attempts have been made to provide open CTI protocols, the most successful of which is the Computer Supported Telephony Applications (CSTA).

CTI software applications enable computers to manipulate the telephone domain as well as the data/computer domain. A simple CTI application is a telephone directory application that maintains a catalog of names, addresses, company details, and telephone numbers, wherein those numbers can be selectively and automatically dialed in the CTI computer. A more sophisticated CTI application is automatic call distribution to route a large number of telephone calls to telephone agents based on data instructions in a call center computer. An application programmer interface (API) allows an application program residing in a computer to invoke certain telephony actions and enables development of new applications while protecting existing software. The API decouples various applications from the underlying platform such as a PBX control platform.

There is a long felt need to efficiently and effectively provide and coordinate telecommunication services for an organization or other types of subscriber groups located in different geographical locations. Such organizations, businesses, and groups of subscribers also need advanced telecommunications service functions like internal/private numbering plans, automatic call distribution, personal telephone support where telephony functions are invoked by a user interacting with his computer terminal, customer support services where data is displayed on a computer terminal to assist in the current conversation, special applications for institutions like hotels, schools, etc., data accesses to switch supported and computer supported databases, and so on.

Attempts have been made to address these problems by public telephone operators using central telephone switching office equipment as well as by private networks using dedicated Customer Premise Equipment (CPE). CPE solutions are typically constructed around a private branch exchange which either itself possesses basic control functionality or is controlled by an external application server connected by a CTI data link. Within this CPE-based environment, a variety of different proprietary application servers using computer-based protocol to control the PBX may be used. For purposes of this application, this wide range of application servers is encompassed generally by the term CTI server. Applications running on a CTI server may be used for services such as routing of incoming calls to an idle agent in an automatic call distribution environment, handling display of messages, rerouting functions, multiple party calls, etc.

A significant advantage of CPE-based systems using PBXs and CTI servers is that new and customized service features may be quickly and relatively inexpensively developed and provided. Still, there are a number of drawbacks with PBX-CTI server solutions. For example, a CTI server can only control those telephone extensions in a private telecommunications network which are associated with the private network's PBX. At a business level, private networks require that a customer purchase, install, and maintain telephony switching equipment at the customer's premises. Further, variations in capabilities and protocols between different PBX manufacturers make it difficult to "mix and match" private network features designed by one manufacturer for its PBX for use on another manufacturer's PBX. Even if there is support for networked PBXs controlled by a single CTI server, there is significant limitation in the functionality that may be offered across two or more PBXs. Of course, networked PBXs also require that the customer purchase, install, and maintain separate networks. Still further, it is difficult and expensive to incorporate small clusters of remote extensions/subscribers into a private network. In particularly inefficient cases, it may be necessary to install a separate PBX at a remote location in order to incorporate only a handful of subscribers into the main organization network.

Public telecommunication network operators have attempted to meet the above-described needs using a central office switch service referred to as CENTREX where the functionality of a PBX is emulated by software in the central office switch. However, the CENTREX approach has not met customer requirements with respect to openness and flexibility. For example, the CENTREX solution is restricted to the flexibility and openness provided by the central office switch. Customers typically cannot connect generally available computer application servers, such as CTI servers, to control call and service handling in the central office switch. Another stumbling block for solutions offered by telecommunication network operators is that service development is usually quite slow and rigid due to the centralized nature of public telecommunications networks and ongoing standardization work in that arena.

The present invention solves these problems and meets the needs noted above by integrating services offered by computer application CTI servers from the private network with intelligent network (IN) services offered from the public telecommunications network. In fact, the present invention provides an arrangement and procedures that allow currently available CTI servers designed to work with PBXs to communicate instead with the intelligent network to cooperatively deliver telecommunications services. As a result, the present invention combines the benefits provided by IN-based and CPE-based systems.

More specifically, a telecommunications system in accordance with one example embodiment of the present invention includes a public telecommunications intelligent network (IN) including an IN service control element and an IN service switching control element used to provide IN services following IN control procedures. A private telecommunications network includes a CTI server that provides CTI services following CTI control procedures. A network gateway is provided between the public and private networks and permits the CTI server to request a service from the IN service control element. In an example embodiment of the present invention, this network gateway is referred to as a CTI gateway. The CTI gateway establishes a service logic communications path between a service control function in the IN service control point and a computing function in the CTI server.

A significant advantage of the present invention is that private network telecommunications services can be provided without having to purchase, install, or maintain a PBX or other private switching equipment. Instead, the CTI gateway includes an interface that emulates a private branch exchange switch to receive service communications from the CTI server. This way currently available CTI servers can be implemented without significant modifications or additions. On the intelligent network side, the CTI gateway also includes an IN interface that emulates a public IN node to receive service communications from the IN service control point. Thus, the CTI server requests a service from the CTI gateway using a CTI control protocol, and the IN service control point responds to that service request with the CTI gateway using IN-based protocols, e.g., INAP. The CTI gateway performs the necessary conversions to complete the communications in both directions.

As a result of the present invention, a business or other organization can establish a virtual private network (VPN) using a CTI-type server connected by a network to a plurality of operator workstations, each operator workstation being associated with the telephone. These telephones and other telephones are connected to an intelligent network. Even though there is only one organization, groups of telephone devices may be located in separate geographical locations. Various private network services such as internal private numbering plans, automatic call distribution, call reroutings, etc. may then be provided through the CTI gateway with the assistance of the intelligent network. As a result, the size of the virtual private network is limited only by the size of the intelligent network.

The present invention network therefore provides a method of enhancing telecommunication services offered in a private network controlled using a computer serving a private network using services from an intelligent network. The method includes providing a gateway between the computer server and the service control element of the intelligent network. The computer server requests from the gateway a switching service for the private network. The gateway then conveys a switching message corresponding to the requested switching service to the IN service control element. In response to the switching message, the service control element performs the requested switching function using one or more IN switching elements.

Service logic corresponding to a private network service is established in the IN service control element, and one or more triggering conditions is established in the one or more IN switching elements. When the IN switching element detects a call having a trigger condition, the IN service switching invokes the private network service logic in the IN service control element. The detection of the call and related call information are forwarded and stored in the gateway. That information may be communicated to the computer server in the private network via the gateway. The computer server processes the call information and instructs via the gateway the IN service control element to complete the call. The IN service control element then instructs the IN service switching element to complete the call.

As a result of the present invention, private network extensions/subscribers are not limited to one PBX or to a central office switch, i.e., CENTREX. Instead, the extent of the private network is limited only by the extent of the IN network. In essence, the present invention provides a "virtual" or logical PBX within the intelligent network, and as a result, no switched equipment is needed by customers/organizations. By integrating the services provided by the intelligent network with those provided by private network CTI servers, the variety and sophistication of services that can be ultimately designed and provided to customers is significantly advanced. For example, IN services offer additional capabilities such as handling of large multi-party calls and charging capabilities. Like the switching functionality, other expensive special resource functions may also be centralized and therefore utilized more efficiently.

Additional objects, advantages, and features of the present invention will be set forth in part in the description which follows, and in part will become apparent to those skilled in the art upon examination of the following, or may be learned by practicing the invention.

DETAILED DESCRIPTION

In the following description, for purposes of explanation and not limitation, specific details are set forth, such as particular embodiments, elements, interfaces, hardware configurations, data structures, software flows, techniques, etc. in order to provide a thorough understanding of the present invention. However, it will be apparent to one skilled in the art that the present invention may be practiced in other embodiments that depart from these specific details. In other instances, detailed descriptions of well known methods, devices, and elements are omitted SO as not to obscure the description of the present invention with unnecessary detail.

Figure 1:
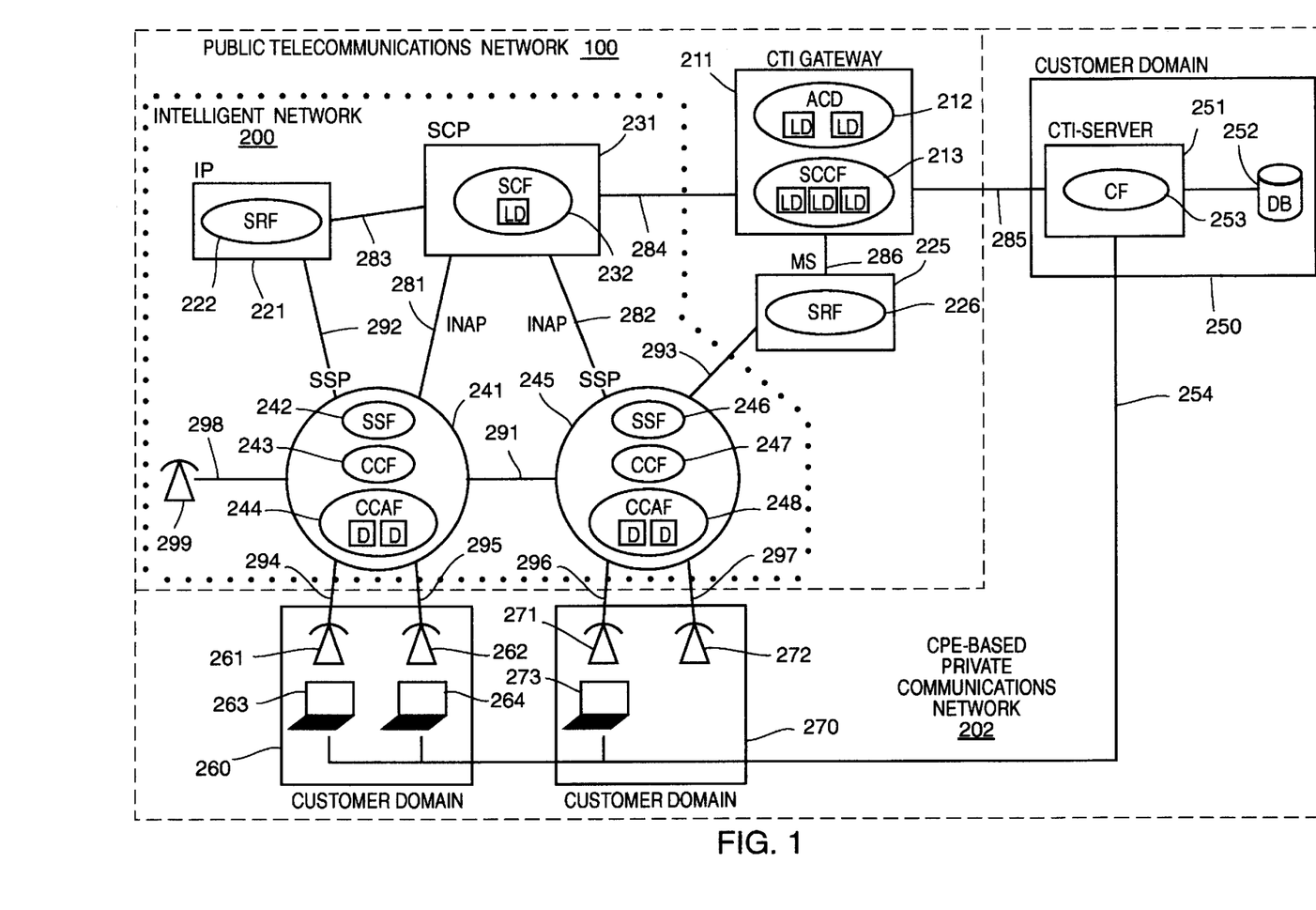
FIG. 1 is a function block diagram illustrating an example, non-limiting embodiment of the present invention.

FIG. 1 is a function block diagram of an example, non-limiting embodiment of the present invention. A public telecommunications network 100 is separated by a dashed line from a customer premises equipment (CPE)-based private communications network 202. The public telecommunications network 100 includes (among many other things not shown here) an intelligent network 200, a CTI gateway 211, and a media server 225. The intelligent network 200, being a part of public telecommunications network 100, is also considered a public network.

The CPE private communications network 202 includes a plurality of customer domains 250, 260, and 270 that belong to the same business, organization, or other customer. Customer domain 260 includes a plurality of telephone devices represented by telephones 261 and 262 connected to the public telecommunications network 200 at a service switching point 241. Also included in the customer domain 260 are a plurality of operator workstations represented by two computer terminals 263 and 264. The workstations are connected to a private data communication network 254 that connects computers in all three of the customer domains 260, 270, and 250.

Another customer domain 270 is shown remotely located from customer domains 260 and 250. Customer domain 270 contains two telephones 271 and 272 which are connected to the public telecommunications network 200 at service switching point 245. Also shown is an operator workstation 273 connected to the private communications network 254. Of course, only a representative number of telephones and operator workstations have been shown in the customer domains for simplicity. There may of course be many telephones like device 272 which are stand-alone telephones and are not associated with operator workstations. However, for those users having associated telephone devices and workstations, a user can contact other workstations in the network as well as the CTI server 251 using electronic mail type data communications. As a result, the user may use his workstation to perform various functions including telecommunication functions such as computer supported call setup, call forwarding, etc. via data commands to the CTI server.

The CTI server 251 is the service control element for the CPE-structured private communications network 202. Different types of CTI servers having different CTI architectures, supplied by different vendors, configurable with different PBXs, etc. may be employed with the present invention. The CTI server 251 includes computing functionality 253 as well as an access to database information from database 252 to perform any of a variety of telecommunications services. The CTI server 251 includes a set of general computer applications in addition to the computing function 253. The computer function and applications may selectively provide a number of different services such as telemarketing, customer care, call routing, etc. (not shown in FIG. 1). The CTI server 251 may of course perform those services described in the background section as already performed by CTI servers as well as new services that take advantage of and integrate IN-based services. Typically, the CTI server employs at an application layer a set of messages and associated sequencing rules for communications referred to here generally as a CTI protocol. Preferably, the CTI gateway is constructed using scripted logic so that it may be readily adapted to different capabilities and protocols provided by different CTI servers. Because of this flexibility, any proprietary or open CTI protocol may be employed such as computer support telephony applications (CSTA)—an "open" CTI protocol.

The intelligent network 200 includes a service control point 231 having a service control function 232 and one or more logical devices (LD). Logical devices may be pure software objects which may be manipulated and monitored via the CTI gateway. In the service control point, service scripts in the service control function 232 are regarded as logical devices which may be monitored and controlled by the CTI server via the CTI gateway. The service control function 232 contains service logic used in the public intelligent network to provide IN services. The service control architecture in service control points is independent of the underlying communications network. Each IN service is typically composed of several service features or basic reusable components called service independent building blocks (SIBs). Service independent building blocks provide network operators with the ability to design their own advanced services as service "scripts" by properly selecting and sequencing basic service script modules. A service script contains service logic and service data in a particular sequence of SIBs designed and tested to provide a particular service. During call processing and rendering of a service, the service script corresponding to the service is "interpreted" or executed to provide the requested service.

The service control point 231 is connected to one or more service switching points. Two service switching points (SSP) 241 and 245 are shown in FIG. 1. Each service switching point includes service switching functionality (SSF) 242, 246. The SSPs 241 and 245 also include respective call control functions (CCFs) 243 and 247 as well as respective call control access functions (CCAFs) 244 and 248. A CCF is the core of the traditional telephony switch which performs the actual switching of calls. The CCF provides the service switching function with "hooks" and "handles" to allow the call to be controlled by the service control function. The CCAF provides connectivity between a customer's telephone and the public telephony network. A large number of telephone terminals (only one representative terminal 299 is shown) is connected either directly or through intervening nodes/networks to an SSP.

When a service subscriber/user dials a telephone number relating to an advanced service, i.e., an intelligent network call, the local exchange transfers the call to an SSP. The SSF detects a trigger condition during the normal switching process. Such a trigger condition may occur at the origination of a call, during a call, and at the termination of a call. After triggering on an incoming IN call, the SSF sends a message to the SCF 232 in the service control point 231. Information flows between the network functions residing in the different service control and service switching points are implemented in the IN application layer protocol (INAP). The INAP protocol uses transport capabilities application part (TCAP) on top of connectionless SCCP (signaling connection control part). The application layer messages are specified in abstract syntax notation one (ASN. 1). The SSPs 241 and 245 are connected to the SCP 231 by INAP links 281 and 282, respectively.

After the SSF detects a trigger, it sends a message containing the dialed number and general call information to the SCF, and the SCF invokes appropriate service logic to analyze the received message and perform the requisite service. The SCF issues one or more commands to the SSF to initiate appropriate switching actions to fulfill the service such as setting up or releasing telephony connections, activating an intelligent peripheral, etc.

An intelligent peripheral 221 is connected both to the service switching point 241 via access line 292 and to the service control point 231 by access line 238. The intelligent peripheral 221 contains a specialized resource function (SRF) 222 used to conduct communication with subscribers by sending various automated voice announcements and receiving responses in the form of subscriber dual tone multiple frequency (DTMF) digit tones. Of course, any type of user interaction mechanism may be supported by the IP. Similarly, a media server (MS) 225 may be connected for example to the SSP 245 by link 293 and to the CTI server 251 by a data link 286. Media server 225 contains a specialized resource functionality (SRF) that may be used for example to perform user interaction like interactive voice response.

The service control elements in both networks, i.e., the SCP 231 and the CTI server 251 in this example, are connected by way of a "gateway" labeled for this example embodiment as the CTI gateway 211. The SCP 231 communicates with the CTI gateway 211 over an "extended" INAP interface 284. On the other side of the gateway, the CTI interface 285 is based on a different, computer-based, data communications network level protocol using the standard transaction capability part (TCAP) which may be carried over a signaling system 7 network or any other suitable underlying protocol such as TCP/IP, which supports a CTI applications protocol like CSTA. Any CTI protocol may be used, and therefore, the interface is identified as the CTI interface 285.

In a preferred but non-limiting embodiment, the extended INAP interface 284 employs cooperative call processing procedures described in commonly-assigned, related patent application entitled "Cooperative Call Processing Across Public and Private Intelligent Networks" incorporated by reference above. Details of such enhanced, cooperative processing procedures are set forth in that patent application. Briefly, a logical relationship is established over an end-to-end service logic communications path between the service logic in the SCP 231 and the service logic in the CTI gateway 211 using a small set of operations. With that set of operations, the CTI gateway requests a service feature to be performed by the SCP. A service feature request is made using a Start operation coupled with a specific service feature request argument and corresponding data attributes for the specific service feature argument. When the Start operation is transmitted by the service control logic of the CTI gateway 211 to the SCP 231, the SCP 231 communicates that request to the appropriate SSP. The SCP 231 also returns a Continue operation coupled with a specific service feature result argument. After the service feature result is returned, a determination is made if further servicing is needed to provide the requested service feature. If so, a Continue operation coupled with an appropriate argument is transmitted. Otherwise, a Stop operation is used to logically complete the requested service feature. The operation procedures also include an Event operation coupled with a specific service feature event argument for transmitting one or more events that the other network's service logic is to take into account when providing the requested service feature. The client/server model of communications between the SCP and the CTI gateway is symmetric. In other words, the SCP may function as a client sending service requests, and the CTI gateway may function as a server.

To facilitate interaction at a service logic level and to increase the flexibility of the CTI gateway 211 to adapt to different types of CTI servers and CTI protocols, it is preferred that the CTI gateway service logic be scripted using service independent building blocks (SIBs). If the CTI gateway is constructed using scripted logic, it may be readily adapted to different capabilities and protocols provided by different CTI servers. Of course, the service logic in the CTI gateway could also be programmed using other programming techniques/models.

When viewed from the public intelligent network, the CTI gateway 211 "appears" to be providing additional service control functionality to the service logic in the SCP 231. Alternatively, and viewed from the CTI server 251, the CTI gateway 211 "appears" to be providing switching functionality for the computing function 253 in the CTI server. In effect, the CTI gateway 211 receives and translates service requests from both interfaces so that they can be conveyed to the other network's service logic Given this dual functionality, the CTI gateway 211 includes a switching-control coordination function (SCCF) 213. To coordinate switching in the public telecommunications network for the private communications network 202. The SCCF also coordinates user interactions performed by the specialized resource function either in the intelligent peripheral 221 or in the media server 225. The CTI gateway 211 also includes an automatic call distribution (ACD) function for distributing incoming calls to agents within a particular business, organization, or other group.

Although there is a symmetric client/server relationship between the CTI server 251 and the service control point 231 via the CTI gateway 211, the present invention will be described (for purposes of illustration only) in the context of the CTI server as the client and the SCP as the server. In particular, the example application of the present invention is that of a virtual private network (VPN) service provided by the private network 202 implemented using the public intelligent network 200.

Figure 2:
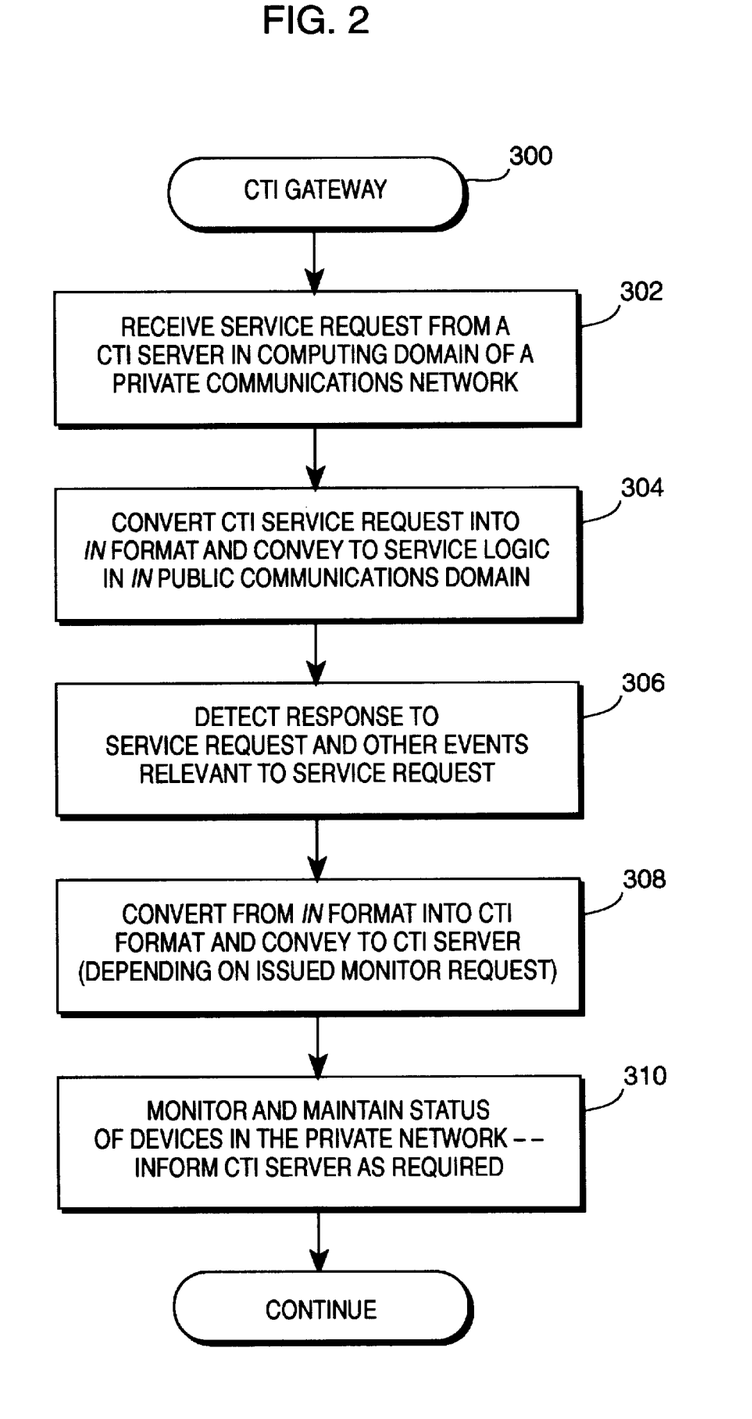
FIG. 2 is a flowchart diagram illustrating example procedures performed by the CTI gateway shown in FIG. 1.

The general procedures performed by the CTI gateway 211 in requesting services from the CTI server of the IN network will now be described in conjunction with the example flowchart routine 300 shown in FIG. 2. Initially, the CTI gateway 211 receives a service request (in this case a switching request) from the CTI server 251 in the computing domain of the CPE-based private communications network 202 (block 302). The CTI gateway converts the service request from a computer-based protocol (CSTA, TAPI, TSAPI, etc.) into an IN protocol format and conveys the converted message to the IN service logic element, e.g., the SCP, in the public communications domain (block 304). Whenever a service is requested by the CTI server 251, the CTI gateway 211 establishes a logical communications link with the CTI gateway functioning as a converting/conveyance mechanism. This logical communications path may be established via a direct access link or through existing networks.

A response from the intelligent network to the service request or other events relevant to the service request is transmitted over the extended INAP interface 284 (block 306) and converted in the CTI gateway 211. More specifically, the CTI gateway 211 converts the response/event from an IN-based protocol format into a CTI protocol format and conveys the converted message to the CTI server 251 (block 308). This step may be optionally performed depending upon the type of CTI "monitor" request that the CTI server 251 may have issued for a particular service or for a particular device. The CTI gateway 211 maintains a status table for each device being monitored in various service applications. In the virtual private network (VPN) example, the CTI gateway 211 monitors and maintains the status of devices in that VPN and informs the CTI server 251 as required of any change in status (block 310).

The following set of flowcharts illustrated in FIGS. 3A, 3B, 4, and 5 will now be used to describe the example operation of the system shown in FIG. 1 to provide a virtual private network service using the CTI server and IN resources from the public IN network 200. A VPN routine 320 for processing outgoing calls from the virtual private network is now described in conjunction with the flowchart in FIG. 3A.

Figure 3A:
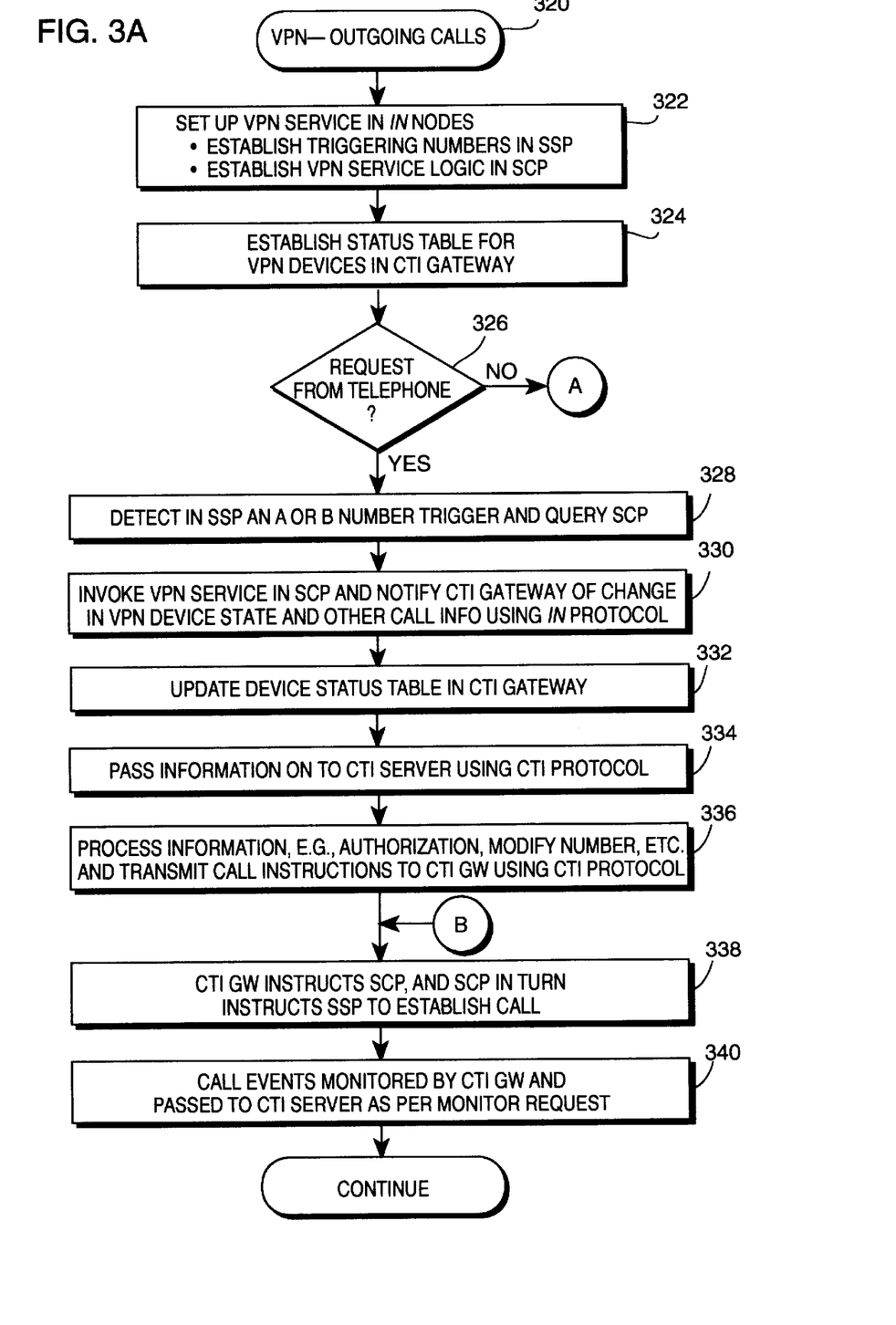
FIGS. 3A and 3B are flowcharts illustrating example procedures for a virtual private network service feature for servicing outgoing calls from the virtual private network as one example application of the present invention.

Initially, the VPN service is set up in the appropriate nodes in the intelligent network (block 322). This service may be requested and established with communications from the CTI server 251 by way of the CTI gateway 211 or information downloaded to the SCP and SSP nodes through a traditional IN service design center. In any event, the setup includes establishing triggering telephone numbers for the VPN service in the SSPs and establishing VPN service logic in the SCPs such as VPN service scripts to be invoked when the VPN service is triggered. Another initial procedure is to establish a status table for devices contained in the VPN stored in memory in the CTI gateway (block 324).

Once these initial setup procedures are accomplished, a decision is made in block 326 whether an outgoing call request from the VPN is from a telephone. If not, the request is from a workstation in the private network, and control proceeds via flag A to the sequence of procedures shown in the flowchart in FIG. 3B. If the request is from a telephone, that outgoing call request is detected in the SSP as a trigger number (block 328). The SSP then sends a query to the SCP, which in response, invokes a VPN service script. The SCP notifies the CTI gateway of the change in VPN device state, i.e., the telephone in the VPN making the outgoing call, along with other call information (block 330). As mentioned above, communications from the SCP over cooperative call processing interface 284 to the CTI gateway are configured in the extended INAP protocol. The protocol procedures outlined in FIG. 2 are employed by the CTI gateway to make the necessary conversions. The CTI gateway updates its device status table (block 332), and passes on the information regarding that device and/or other call information to the CTI server in the private communications network (if the appropriate monitor request has been set by the CTI server) using a CTI protocol format (block 334).

The CTI server processes the information including authorizing the telephone call and may modify the telephone number (block 336). For example, if the dialed number is an abbreviated extension number, the CTI server converts the extension using appropriate private numbering plan conversion tables into a recognized public telephone network telephone number. After processing is completed, the CTI server transmits the appropriate call instructions and data to the CTI gateway in the CTI protocol format. Notably, the CTI server communicates with the CTI gateway as if the gateway were a PBX switch. The CTI gateway translates these PBX commands into commands that can be recognized, understood, and implemented in the intelligent network. Using the appropriately translated and formatted commands, the CTI gateway instructs the SCP over the extended INAP interface 284 to establish the call The SCP in turn instructs the SSP to establish the call using standard call routing procedures and using any information provided from the CTI server (block 338). The CTI gateway monitors call events which may be communicated from the SCP regarding the call, e.g., call termination. The call events are used to update the device status table in the CTI gateway and may also be passed along to the CTI server depending on the monitor state (block 340).

Figure 3B:
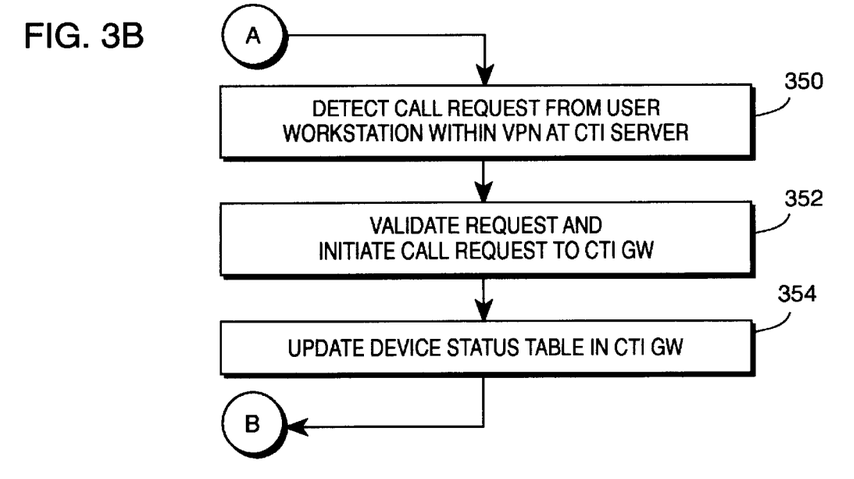

An outgoing call from the private network may also be initiated from a workstation within the private network as is now explained in accordance with the flowchart shown in FIG. 3B. If the operator indicates a desire to make an outgoing call through a command entered at his computer workstation, that command is conveyed via the private communications network to the CTI server which detects the call request including the caller's corresponding telephone number, the called number, etc. (block 350). The CTI server validates the call request and initiates a call request service to the CTI gateway (block 3 52). The CTI gateway updates the status of the device table (block 354), and follows the procedures outlined in blocks 338 and 340 described in conjunction with FIG. 3A.

Figure 4:
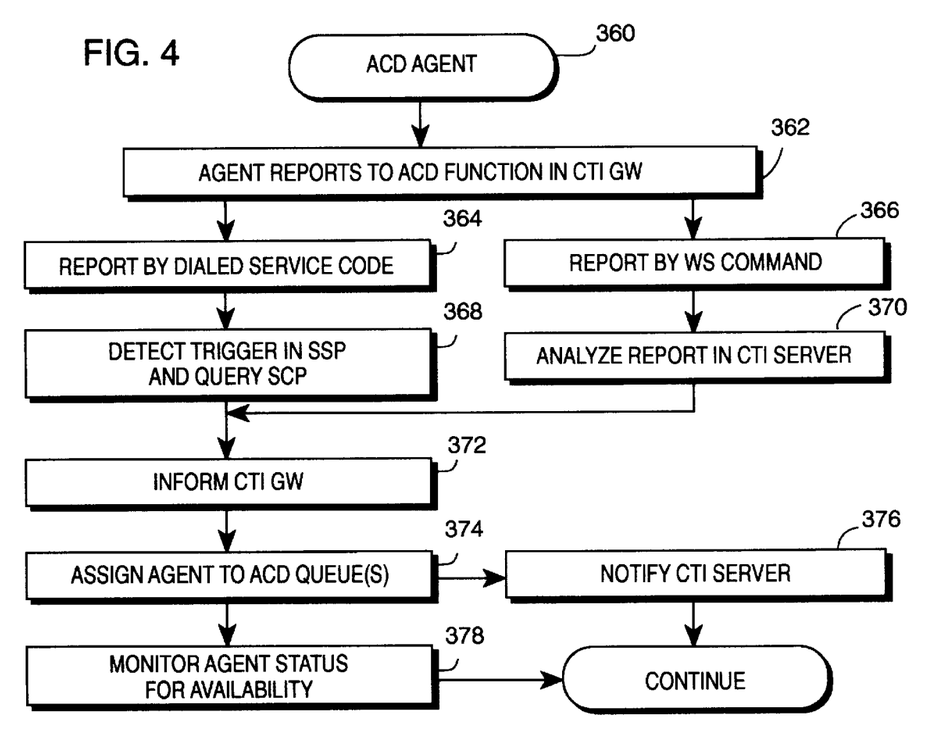
FIG. 4 is a flowchart diagram illustrating example procedures of an automatic call distribution application of the present invention.

Another service feature that may be provided in the context of a VPN is an automatic call distribution service (ACD) where users in the customer domains 260 and 270 may act as agents for the company/organization. FIG. 4 is a flowchart illustrating an example set of procedures by which a user can log in or otherwise indicate his availability as an agent. The ACD agent routine 360 commences with an agent reporting to the ACD function 212 in the CTI gateway 211 (block 362). This report can be performed in two alternative manners. First, the agent may report in by dialing on his telephone an appropriate service number or code (block 364). This special service number/code is detected as a trigger condition in the SSP in the intelligent network which sends an appropriate query to the SCP (block 368). The service invoked in the SCP as a result of that query causes a message to be conveyed to the CTI gateway (block 372) requesting that this operator be logged in/be shown as available as an ACD agent. Second, a user may report in by entering a command on his workstation (block 366). A command is conveyed via the private network 254 to the CTI server 251 which then analyzes the request (block 370) and informs the CTI gateway 211. Once the CTI gateway is informed, the CTI gateway assigns the agent to one or more ACD queues (block 374). The CTI server is notified of this assignment (block 376), and the agent's status is monitored for availability to take incoming calls (block 378).

Figure 5:
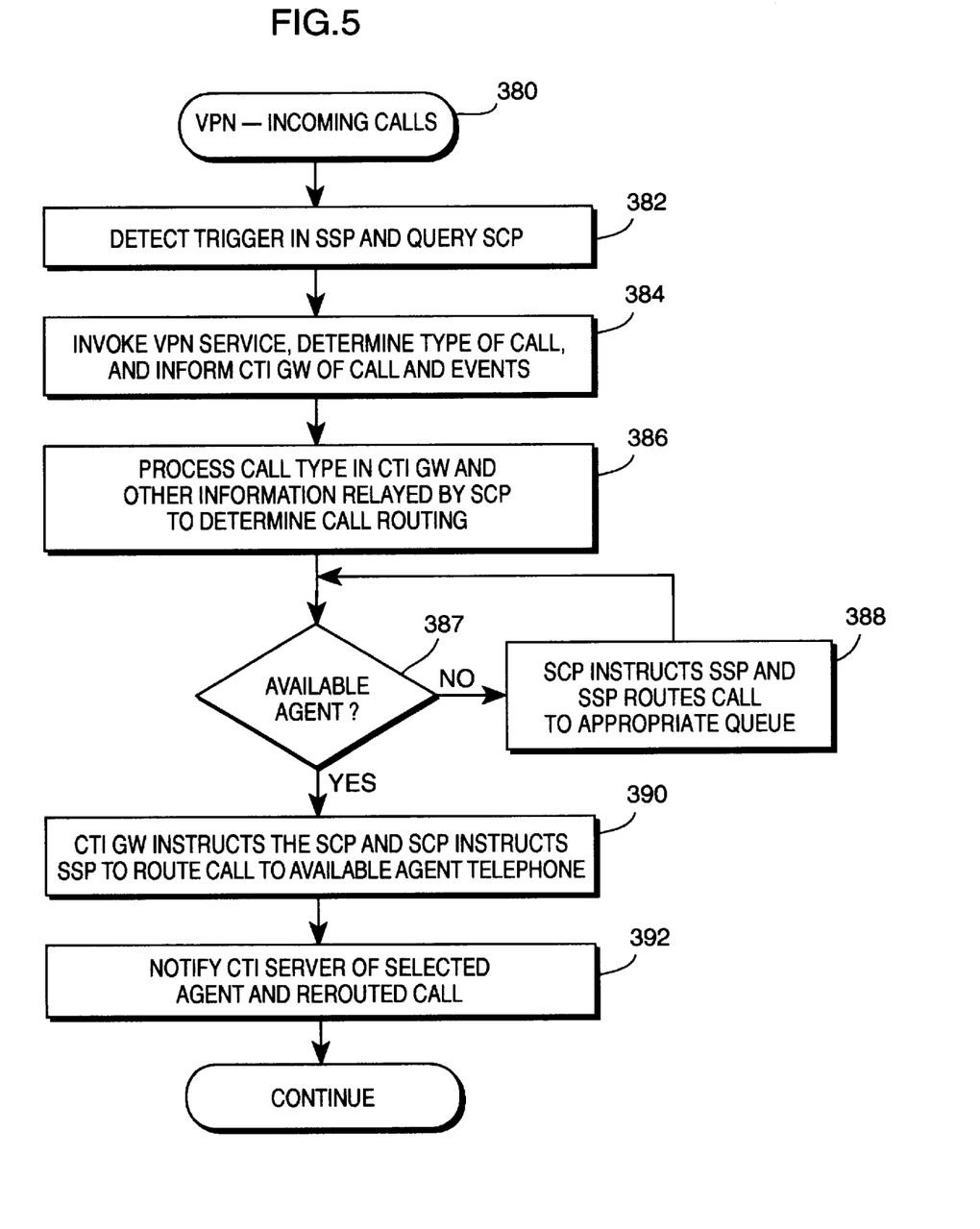
FIG. 5 is a flowchart diagram illustrating example procedures of a virtual private network service for incoming calls to the virtual private network.

Calls coming into the virtual private network service are now described in conjunction with the flowchart shown in FIG. 5. The VPN incoming calls routine 380 begins with the SSP detecting a trigger, e.g., receipt of a B number corresponding to a user in the VPN, and generates a query to the SCP (block 382). The query invokes the VPN service, and the SCP determines the type of call, e.g., whether it is a direct indial call or a call to be distributed using the automatic call distribution function (block 384). The SCP informs the CTI gateway of the presence of the call, the type of call, and any relevant events. The CTI gateway processes the call type and other information relayed by the SCP and provides routing instructions to the SCP (block 386). If no agent is available (block 387), the SSP routes the call to the appropriate ACD queue specified by the CTI gateway (block 388). If a queue announcement is to be generated during the time the call is in queue, the CTI gateway orders the SCP to connect a Specialized Resource Function (SRF) provided by IP 221. The CTI gateway may alternatively instruct the SCP, and in turn the SCP instructs the SSP to route the call to the SRF included in the media server (MS) 225 in the private network 202. The CTI gateway may request further routing instructions from the CTI server. For example, the CTI server may, after further analysis of the incoming call request and possibly after correlation with data in database 252, decide to connect the call to a specific ACD queue device or agent.

If an agent is available to handle the incoming call, the CTI gateway selects that agent and instructs the SCP of the telephone number of that agent, and the SCP instructs the SSP to route the call to that agent's telephone (block 390). The CTI gateway informs the CTI server of the selected call agent and the rerouted call (block 392). The various status and events being monitored in the CTI gateway and optionally in the CTI server are updated.

As mentioned in the summary of the invention, the cooperative relationship between the CTI server and the SCP using the CTI gateway greatly expands the depth and variety of services that can be offered by a private network. As a result of the present invention, private network services like ACD or VPN can be constructed using only a CTI server, operator workstations, telephone terminals, and a CTI gateway. No switching equipment is needed by customers or organizations to obtain such advanced services. The extent of a virtual private network is then limited only by the extent of the public intelligent network. The CTI server also has access to other functions that public intelligent network can offer, but that an ordinary PBX cannot offer (e.g., handling of large multi-party calls and charging for call services). Moreover, if the CTI gateway is instructed using scripted call logic, the intelligent network and the CTI gateway may be readily adapted to handle different types of CTI servers having differing capabilities, architectures, and protocols.

Figure 6:
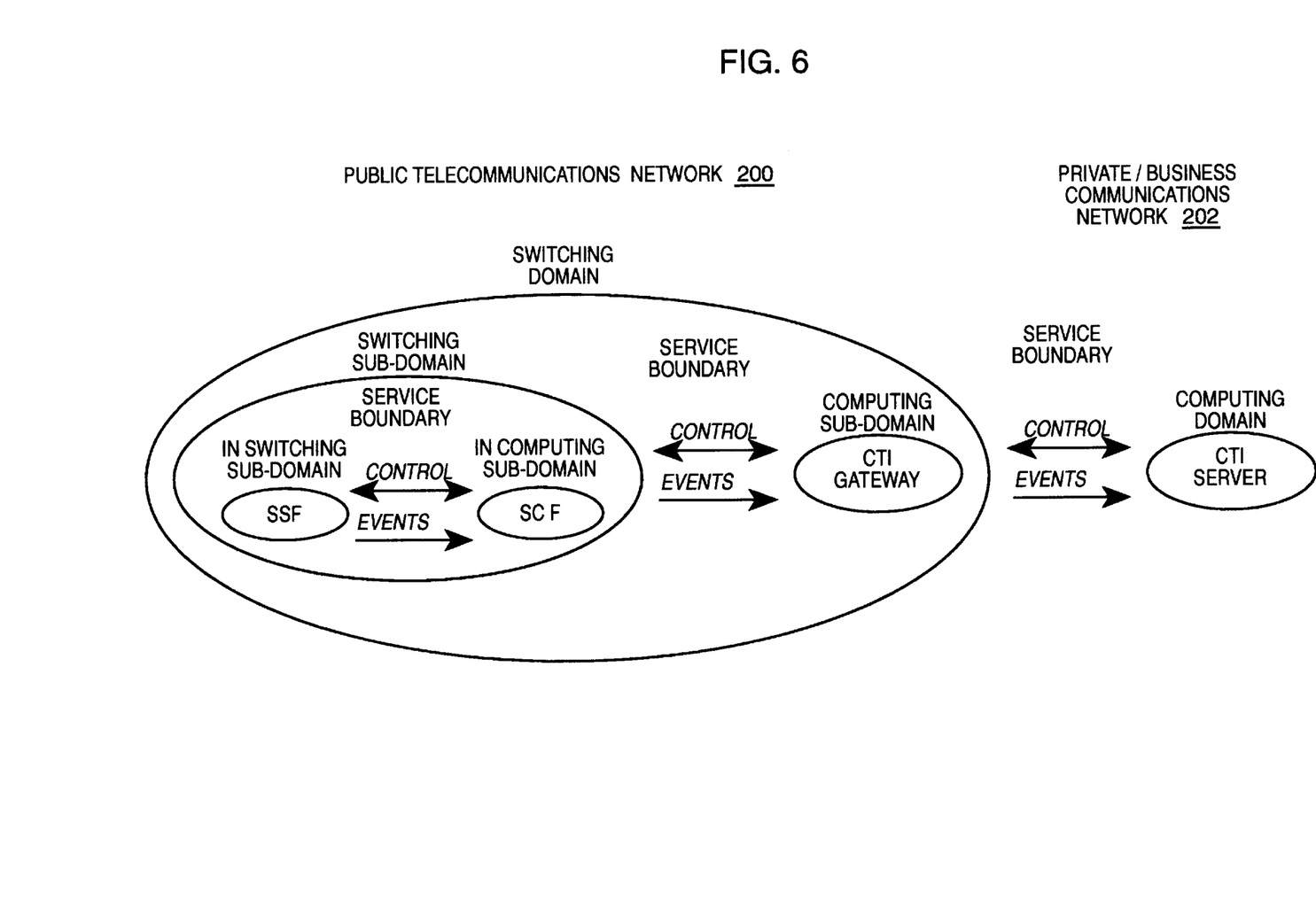
FIG. 6 is a more conceptual, domain-based illustration of the present invention.

A more conceptual illustration of the present invention is provided in FIG. 6. An overall telecommunications system shown in FIG. 1 is divided into switching and computing/control domains. Principal relations between switching functions and computing functions are shown at different levels in the system (specialized resource functions are omitted to simplify the drawing). At each level, the switching function in the switching domain and the computing function in the computing domain may request services from the other domain as indicated by the bidirectional "Control" signal lines. For example, the switching function may request a computing service from the computing function by sending a request for a computing function to the computing domain across a service boundary. While both switching and computing control requests ultimately receive a response, Events are generally telephony/switching related events that flow in only one direction from the switching domain to the computing domain. In the example shown above, such an example might be when the SSF notifies the SCF about a new incoming call (the Event) which requires IN control treatment. The computing function may request switching services from the switching function in the form of a Control message. That control message may typically instruct the switching function to manipulate the call handling in one way or another. An example is when the SCF instructs the SSP to complete a call to a particular destination. Alternatively and as noted earlier, the SCF may request a computing service from the CTI server.

The first level of divided switching and control functions is at the intelligent network level. The SCF issues control instructions to the SSF, and the SSF passes event notifications about the status and progress of a call to the SCF. The SSF also contains relevant triggers to notify the SCF about a new incoming call requiring IN treatment.

The present invention introduces a new level to this model. At a next level, the control SSF and SCF communications are grouped into a switching subdomain. The CTI gateway is then a computing subdomain passing control/service requests to the switching subdomain and receiving back events. At still a next higher level, an external computing domain corresponding to the CTI server is interfaced across the service boundary with the switching subdomain and computing subdomain grouped at this level into a single switching domain. The CTI server perceives all of the CTI gateway, the SCF, and the SSF as a uniform switching domain that the CTI server can control using a CTI protocol. The switching domain provides the CTI server with relevant events regarding devices within its control, and the CTI server exercises call control in the computing domain.

At this highest level, the CTI considers only mere abstractions or logical representations of the devices, connections, services, etc. provided within the IN switching subdomain. This abstraction and functional separation of control and switching events greatly simplifies what would otherwise be an extremely complex service. For example, the inventive model shown in FIG. 6 permits creation and control of a virtual private network service without the external CTI server understanding how the virtual private network is constructed or controlled. In fact, the CTI server treats the virtual private network provided by the switching domain as if it were a conventional, local PBX.

Figure 7:
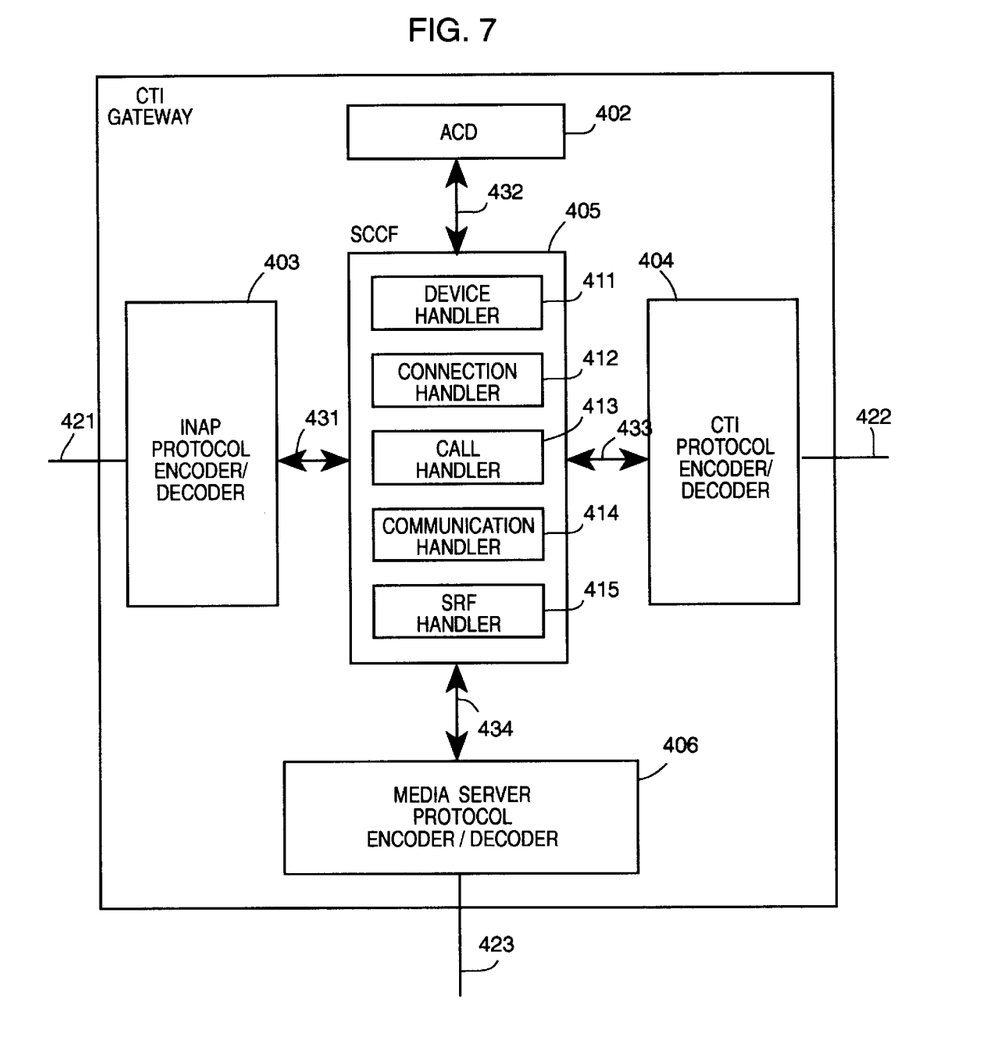
FIG. 7 is a function block diagram illustrating in more detail the CTI gateway in accordance with an example embodiment of the present invention.

FIG. 7 is a function block diagram illustrating one possible implementation of the CTI gateway. In particular, the CTI gateway may be realized as a set of software application modules within a general purpose computer or as a plurality of computers performing distributed processes. The general purpose computer also includes communications interface equipment to allow the CTI gateway to be connected to the signaling network used in the public intelligent network 200 as well as the CTI server in the CPE-based private telecommunications network 202. Software application modules may be implemented as scripted and/or hard coded modules. A scripted implementation may be preferred to permit the CTI gateway to be readily adapted to different types of CTI servers. On the other hand, specialized hardware and software implementations often result in improved performance albeit with reduced flexibility/adaptability.

The central switching function of the CTI gateway is provided by the switching control coordination function (SCCF) 405. The SCCF 405 includes a number of sub-software modules. A device handler module 411 abstractly represents the devices that may be monitored and controlled by the CTI server via the CTI interface 422. The logical devices represented in the device handler 411 are in essence abstractions of both physical and other logical devices located in the public intelligent network 200 and in the CTI gateway itself. Examples of physical devices might include telephone terminals, network interface devices, trunks, trunk groups, etc. Examples of logical devices might include IN services in the SCP and the ACD module 402.

Logical devices administered by the device handler are associated with a unique identifier used to maintain a status record of each device. The status of each device is updated constantly upon receipt of information from the public intelligent telecommunications network via the extended INAP interface 421 and from the CPE-structured private communications network 202 via the CTI server interface 432. Device handler 411 allows the CTI server to request monitoring of a device over that CTI interface. Once monitoring of a device is initiated, all changes in the device state may be communicated to the CTI server via the CTI interface in the form of events. The state of a device may also be sent in a corresponding manner by the CTI server to the device handler via the CTI interface.

A connection handler 412 handles the relationship (connection) between a device and a call. The connection handler 412 allows the connection to be monitored and manipulated via the CTI interface 422. Control orders issued for connection are related to the public intelligent network 200 over interface 421 with the media server 225 over interface 423, and/or to the ACD module 402 over interface 432 depending on the type of resource requested by the connection. Based on call state information returned by the SSP in the extended INAP interface 421, the connection handler 412 maintains a state for each created connection. Changes in the state of the connection are passed on the CTI server via the CTI interface 422.

The call handler 413 provides an "umbrella" function that ties together communication connections between two or more devices. The call handler 413 coordinates individual call handling processes during the life of a call using a call identifier. In addition, a call instance in the call handler 413 is created either as a result of an incoming service request from the public IN network via the IN interface 421 or as a service request from the CTI server via the CTI interface 422. The call handler 413 thus provides a logical relation between the service executed in the SCP and the call processing performed by the CTI server. The call handler 413 is also responsible for coordinating call events sent to the CTI server over the CTI interface 422. Further, the call handler 413 performs overall timing control of various subprocesses and coordinates routing procedures for handling incoming calls with the CTI server.

The communication handler 414 performs the functions needed to conduct the overall CTI gateway function including protocol conversions between the extended INAP 421 interface and the CTI interface 422. The communication handler 414 also coordinates various status and activity checks in both the public and private network via the extended INAP and CTI interfaces 421 and 422, respectively.

The specialized resource function (SRF) handler 415 coordinates activities related to special types of user interactions. Upon request from the CTI server via interface 422, the SRF handler 415 connects the appropriate specialized resource function. Depending on the type of requested resource, the SRF handler 415 may draw upon the SRF available in the public network or in the private network.

The ACD module 402 provides the automatic call distribution function to allow incoming calls directed to the same dialed number/service to be routed to one of multiple ACD agents. The ACD module 402 contains logical devices to identify ACD groups, operator groups, and individual operators. The ACD module 402 also contains higher device structure and distribution parameters used to configure the call distribution. Device state changes related to ACD logical devices and routing procedures for incoming calls subject to ACD treatment are communicated between the device handler 411 and the ACD module 402 via interface 432.

In order to provide connectivity and compatible communication between the public intelligent network 200 and the CTI gateway in the CPE-based private communications network 202, the CTI gateway includes an INAP protocol encoder/decoder 403. The INAP protocol encoder/decoder establishes and maintains communication over extended INAP interface 421 and interprets the INAP protocol so that service requests, responses, and events are properly encoded and decoded depending upon the direction of communication. A CTI protocol encoder/decoder 404 provides connectivity and compatible communication with CTI servers via the CTI interface 422. The CTI protocol encoder/decoder establishes and maintains communications over CTI interface 422 and interprets the CTI protocol so that service requests, service responses, and events are properly encoded and decoded depending upon the direction of communication.

The media server (MS) protocol encoder/decoder 406 provides connectivity and compatible communication with one or more media servers connected to the CTI gateway via interface 423. The media server protocol encoder/decoder 406 establishes and maintains communications over the MS interface 423 and interprets the media server protocol so that the orders from the SRF handler 415 to perform the user interaction service and relay information to the SRF handler 415 via the interface 434 are properly encoded and decoded depending upon the direction of communication.

While the foregoing describes what are considered to be preferred example embodiments of the invention, it is understood that various modifications may be made therein and that the invention may be implemented in various forms and embodiments, and that it may be applied in numerous applications, only some of which have been described. The following claims are intended to cover all such modifications and variations which fall within the true scope of the invention.

What is claimed is:

1. A telecommunications system comprising:
   a public telecommunications intelligent network (IN) including an IN service control element and an IN switching control element providing IN services following IN control and event notification procedures;
   a private telecommunications network including a computer telephony integration (CTI) server providing CTI services to the public telecommunications IN following CTI control and event notification procedures; and
   a network control gateway coupled to the public and private networks establishing a service logic control path between the CTI server and the IN service control element to permit the CTI server to request a service from the IN service control element.

2. The system in claim 1, wherein the CTI server requests the service using the CTI control procedures.

3. The system in claim 2, wherein the network control gateway converts the service request into the IN control procedure format and conveys the converted service request to the IN service control element.

4. The system in claim 3, wherein the IN service control element performs the requested service and conveys an event relating to the requested service to the network control gateway in the IN control procedure format.

5. The system in claim 4, wherein the network control gateway converts the event from the IN control procedure format into the CTI control procedure format.

6. The system in claim 1, wherein the network gateway includes:
   a CTI protocol encoder/decoder, and
   an IN protocol encoder/decoder.

7. The system in claim 6, wherein the network control gateway further includes a switching control coordinator connected to the CTI protocol encoder/decoder and IN protocol encoder/decoder.

8. The system in claim 1, wherein the private network includes:
   plural telephones connected to the public network, and
   plural operator workstations connected to the CTI server by the private network.

9. The system in claim 8, wherein the network control gateway controls distribution of incoming telephone calls to a telephone device corresponding to one of the operator workstations.

10. The system in claim 9, wherein the CTI server sends a telephony order request to the network gateway, the network gateway sends the telephony order request to the IN service control element, and the IN service control element causes the IN switching control element to execute the requested telephony order.

11. The system in claim 1, wherein the CTI protocol is designed to interface with a private branch exchange.

12. The system in claim 11, wherein the network gateway includes:
   a CTI interface that emulates a private branch exchange switch to receive switching service communications from the CTI server, and
   an IN interface that emulates a public IN node to receive service communications from the service control point.

13. The system in claim 11, wherein the private telecommunications network does not include a telephony switch.

14. A telecommunications system comprising:
   a public telecommunications intelligent network (IN) including an IN service control element and an IN switching control element providing IN services following IN control procedures;
   a private telecommunications network including a computer telephony integration (CTI) server providing CTI services following CTI control procedures and a first group of plural telephones connected to the public IN network; and
   a network gateway coupled to the public and private networks through which the CTI server requests a service from the IN service control element,
   wherein a virtual private network connecting the first group of telephones using the public telecommunications intelligent network is established in accordance with communications between the service control element and the CTI server through the network gateway.

15. The system in claim 14, wherein the private telecommunications network does not include a telephony switch.

16. The system in claim 15, wherein the telephones in the first group are located in different geographical locations.

17. The system in claim 15, wherein the private telecommunications network provides an automatic call distribution service.

18. The system in claim 15, wherein the private telecommunications network provides a private numbering plan service.

19. The system in claim 15, wherein the switching functions required to support the virtual private network are performed by the IN service control element and one or more IN switching control elements in the public telecommunications intelligent network.

20. A method of enhancing telecommunications services offered in a private network domain controlled by a private network computer server with services from a public intelligent network (IN) that includes an IN service control element and an IN switching element, comprising the steps of:
   providing a network control gateway between the computer server and the IN service control clement;
   establishing a service logic control path between the computer server and the IN service control element via the network control gateway;
   the computer server requesting from the gateway over the service logic control path a public IN switching service for the private network;
   the gateway conveying a switching message corresponding the requested switching service to the service control element; and
   in response to the switching message, the service control element performing the requested switching function using the switching element.

21. The method in claim 20, wherein the computer server employs a first control procedure format and the public intelligent network employs a second control procedure format, the method further comprising:
   converting the public IN switching service request in the gateway into the second control procedure format, and
   conveying the converted service request to a service control element of the public intelligent network.

22. The method in claim 21, further comprising:
   performing the requested service in the intelligent network;
   conveying an event relating to the requested service to the gateway;
   converting the event from the second control procedure format into the first control procedure format; and
   conveying the event in the converted format to the computer server.

23. A method of enhancing telecommunications services offered in a private network controlled by a computer telephony integrated (CTI) server with services obtained from an intelligent network (IN) that includes a service control element and a switching element, comprising the steps of:
   establishing service logic relating to a private network service in the IN service control element and one or more triggering conditions in the IN switching element;
   providing a gateway coupled to the CTI server and IN service control element;
   detecting in the IN switching element a call having a trigger condition;
   invoking the private network service logic in the IN service control element and communicating information regarding the call to the CTI server;
   processing the call information in the CTI server;
   instructing the IN service control element to complete the call;
   the IN service control element instructing the IN service switching element to complete the call; and
   the IN service switching element completing the call.

24. The method in claim 23, wherein the gateway establishes a service logic communications path between the IN service control element and the CTI server and processes a communication from one of the IN service control element and the CTI server to render the communication understandable by the other.

25. The method in claim 23, wherein the private network includes plural telephones connected to the IN switching element and plural workstations connected to the CTI server, the method further comprising:

detecting in the CTI server a call request from one of the workstations;

processing the call request;

initiating a switching service request through the gateway to the IN service control element;

instructing the IN service control element to complete the call;

the IN service control element instructing the IN switching element to complete the call; and the IN switching element completing the call to a telephone associated with the one workstation.

26. The method in claim 25, further comprising:

receiving a message at the CTI server from an operator indicating availability, and informing the gateway and the gateway assigning the call agent to a call handling queue.

27. The method in claim 26, wherein the message is conveyed to the CTI server from the operator's workstation.

28. The method in claim 26, further comprising:

detecting at the IN switching point a code corresponding to the message and querying the IN service control element, and the service control element conveying to the CTI server information regarding the message.

29. The method in claim 23, wherein the after processing a type of call, the IN service control element is instructed via the gateway to route the call to a selected telephone corresponding to an available agent.

30. The method in claim 29, wherein if there is no available agent, the IN service control element is instructed via the gateway to route the call to a special resource function.

31. The method in claim 30, wherein the specialized resource function is in the private network.

32. The method in claim 30, wherein the specialized resource function is in the public network.

\* \* \* \* \*